US011610289B2

(12) United States Patent
Fan

(10) Patent No.: US 11,610,289 B2
(45) Date of Patent: Mar. 21, 2023

(54) IMAGE PROCESSING METHOD AND APPARATUS, STORAGE MEDIUM, AND TERMINAL

(71) Applicant: Shanghai Harvest Intelligence Technology Co., Ltd., Shanghai (CN)

(72) Inventor: Shiqing Fan, Shanghai (CN)

(73) Assignee: Shanghai Harvest Intelligence Technology Co., Ltd., Shanghai (CN)

( * ) Notice: Subject to any disclaimer, the term of this patent is extended or adjusted under 35 U.S.C. 154(b) by 158 days.

(21) Appl. No.: 17/090,674

(22) Filed: Nov. 5, 2020

(65) Prior Publication Data

US 2021/0142450 A1 May 13, 2021

(30) Foreign Application Priority Data

Nov. 7, 2019 (CN) .......................... 201911083065.6

(51) Int. Cl.
*G06T 5/50* (2006.01)
*G06N 3/04* (2006.01)
(Continued)

(52) U.S. Cl.
CPC ........... *G06T 5/003* (2013.01); *G06N 3/0454* (2013.01); *G06N 3/08* (2013.01); *G06T 5/50* (2013.01);
(Continued)

(58) Field of Classification Search
CPC ...... G06N 3/0454; G06N 3/0472; G06N 3/08; G06T 2207/20081; G06T 2207/20084;
(Continued)

(56) References Cited

U.S. PATENT DOCUMENTS

2008/0025568 A1* 1/2008 Han ....................... G06V 10/50
382/103
2014/0201126 A1* 7/2014 Zadeh .................. A61B 5/7221
706/52
(Continued)

FOREIGN PATENT DOCUMENTS

CN 108765340 A * 11/2018 ............. G06T 5/003
CN 109685032 A 4/2019
(Continued)

OTHER PUBLICATIONS

Ashwin Ashok ,"Capacity of screen-camera communications under perspective distortions", Nov. 15, 2014, Pervasive and Mobile Computing 16 (2015), pp. 239-243.*
(Continued)

*Primary Examiner* — Omar S Ismail
(74) *Attorney, Agent, or Firm* — Harness, Dickey & Pierce, P.L.C.

(57) ABSTRACT

The present disclosure provides an image processing method and apparatus, a storage medium and a terminal. The image processing method includes: acquiring a to-be-processed blurred image, wherein the to-be-processed blurred image is obtained by an under-screen camera through a device screen; inputting the to-be-processed blurred image to a trained generative adversarial network model to obtain a processed clear image, wherein the generative adversarial network model is trained using a preset training sample, the preset training sample includes a clear image sample and a blurred image sample corresponding to each other; and outputting the processed clear image. Embodiments of the present disclosure can improve image quality of an image captured by the under-screen camera.

15 Claims, 2 Drawing Sheets

(51) Int. Cl.
*G06N 3/08* (2006.01)
*G06V 40/16* (2022.01)
*G06T 5/00* (2006.01)

(52) U.S. Cl.
CPC .... *G06V 40/16* (2022.01); *G06T 2207/20081* (2013.01); *G06T 2207/20084* (2013.01)

(58) Field of Classification Search
CPC ........... G06T 5/003; G06T 5/50; G06V 10/34; G06V 10/82; G06V 10/993; G06V 30/142; G06V 40/16; G06V 40/172
See application file for complete search history.

(56) References Cited

U.S. PATENT DOCUMENTS

| | | | |
|---|---|---|---|
| 2014/0270350 A1* | 9/2014 | Rodriguez-Serrano | G06V 20/62 382/103 |
| 2016/0247101 A1* | 8/2016 | Agrawal | B64D 47/08 |
| 2016/0253787 A1* | 9/2016 | Chen | G06T 5/10 382/275 |
| 2017/0083792 A1* | 3/2017 | Rodriguez-Serrano | G06F 16/5854 |
| 2017/0206431 A1* | 7/2017 | Sun | G06V 10/25 |
| 2017/0330059 A1* | 11/2017 | Novotny | G06V 20/70 |
| 2018/0114096 A1* | 4/2018 | Sen | G06T 15/50 |
| 2018/0121767 A1* | 5/2018 | Wang | G06N 3/0454 |
| 2018/0173980 A1* | 6/2018 | Fan | G06V 10/141 |
| 2018/0204076 A1* | 7/2018 | Tripathi | B60Q 9/00 |
| 2018/0357537 A1* | 12/2018 | Munkberg | G06N 3/063 |
| 2019/0080148 A1* | 3/2019 | He | G06V 40/168 |
| 2019/0087648 A1* | 3/2019 | Du | G06N 3/0454 |
| 2019/0095795 A1* | 3/2019 | Ren | G06T 5/002 |
| 2019/0147221 A1* | 5/2019 | Grabner | G06T 7/75 382/103 |
| 2019/0251612 A1* | 8/2019 | Fang | G06F 16/532 |
| 2020/0097818 A1* | 3/2020 | Li | G06N 3/084 |
| 2020/0134282 A1* | 4/2020 | Tian | G06V 40/1318 |
| 2020/0175352 A1* | 6/2020 | Cha | G06N 3/04 |
| 2021/0142114 A1* | 5/2021 | Bondugula | G06T 7/194 |
| 2021/0408491 A1* | 12/2021 | Peng | H01L 51/5271 |

FOREIGN PATENT DOCUMENTS

| | | | |
|---|---|---|---|
| CN | 110012136 A | | 7/2019 |
| CN | 110223254 A | * | 9/2019 |

OTHER PUBLICATIONS

Bo Zhao,"A Survey on Deep Learning-based Fine-grained Object Classification and Semantic Segmentation,"Jan. 18, 2017, International Journal of Automation and Computing,14, pp. 120-130.*

Yousri Kessentini ,"A two-stage deep neural network for multi-norm license plate detection and recognition,"Jun. 18, 2019,Expert Systems With Applications 136 (2019),pp. 160-167.*

Jingjing Zhang,"License Plate Localization in Unconstrained Scenes Using a Two-Stage CNN-RNN,"Feb. 19, 2019,IEEE Sensors Journal, vol. 19, No. 13, Jul. 1, 2019,pp. 5256-5263.*

Jae Shin Yoon,"Pixel-Level Matching for Video Object Segmentation using Convolutional Neural Networks," Oct. 2017, Proceedings of the IEEE International Conference on Computer Vision (ICCV), 2017,pp. 2167-2174.*

Lichao Huang,"DenseBox: Unifying Landmark Localization with End to End Object Detection,"Sep. 19, 2015,Computer Vision and Pattern Recognition,pp. 1-6.*

Dahun Kim,"Two-Phase Learning for Weakly Supervised Object Localization,"Oct. 2017, Proceedings of the IEEE International Conference on Computer Vision (ICCV), 2017,pp. 3534-3539.*

First Chinese Office Action regarding Application No. 201911083065.6 dated Jun. 30, 2022. English translation provided by Unitalen Attorneys at Law.

* cited by examiner

IMAGE PROCESSING METHOD AND APPARATUS, STORAGE MEDIUM, AND TERMINAL

CROSS-REFERENCE TO RELATED APPLICATIONS

The present application claims the benefit of priority to Chinese patent application No. 201911083065.6, filed on Nov. 7, 2019, entitled "Image Processing Method and Apparatus, Storage Medium and Terminal", the entire disclosures of which are incorporated herein by reference.

TECHNICAL FIELD

The present disclosure relates to the technical field of image processing, and more particularly to an image processing method and apparatus, a storage medium and a terminal.

BACKGROUND

With the development of mobile phone screen technology, full screens have become a new development trend. At present, most mobile phone products are restricted by front cameras which take certain space on front screens. In this way, full screen is a concept infinitely approachable. In order to achieve a true full screen, the front camera can be disposed under the screen.

However, for a true full-screen device, since the camera is disposed below the screen, the under-screen camera needs to capture images through the screen, which may result in a poor image quality including ghosting, blurring, and other issues in the captured images.

SUMMARY

Embodiments of the present disclosure provide an image processing method and apparatus, in order to improve the image quality of a blurred image, especially to improve the image quality of an image captured by an under-screen camera.

According to an embodiment of the present disclosure, an image processing method is provided. The image processing method includes: acquiring a to-be-processed blurred image; and inputting the to-be-processed blurred image to a trained generative adversarial network model to obtain a processed clear image, wherein the generative adversarial network model is trained using a preset training sample, and the preset training sample includes a clear image sample and a blurred image sample corresponding to each other.

In some embodiments, the preset training sample includes a plurality of sets of images, and each set of images includes a clear image sample and a blurred image sample captured for a same object.

In some embodiments, the to-be-processed blurred image is obtained by a camera under a device screen taking an image of an object above the device screen, or the to-be-processed blurred image is captured during motion.

In some embodiments, the processed clear image includes a human face, and the image processing method further includes: outputting the processed clear image for human face recognition.

In some embodiments, the image processing method further includes: outputting the processed clear image to a display interface for display.

In some embodiments, training the generative adversarial network model includes: constructing an initial generative adversarial network model; and inputting the preset training sample to the initial generative adversarial network model, to perform an iterative training until a preset number of iterations or a preset training convergence condition is reached.

In some embodiments, a loss function of the generative adversarial network model is least squares generative adversarial network loss function.

In some embodiments, the clear image sample is obtained by the camera taking images of the object without being blocked by anything disposed between the camera and the object, and the blurred image sample is obtained by the camera under a test screen taking images of the object disposed above the test screen, where the test screen and the device screen have a same optical parameter.

In some embodiments, the clear image sample and the blurred image sample have a same resolution.

In some embodiments, the generative adversarial network model includes a generator and a discriminator, when training the generative adversarial network model, the generator is configured to generate a pseudo clear image from the blurred image sample, and the discriminator is configured to determine the pseudo clear image generated by the generator being true or false; when the training of the generating adversarial network model is completed, the generator is configured to generate the processed clear image based on the to-be-processed blurred image.

According to another embodiment of the present disclosure, an image processing apparatus is provided. The image processing apparatus includes: an image acquiring module configured to acquire a to-be-processed blurred image; and an image processing module configured to input the to-be-processed blurred image to a trained generative adversarial network model to obtain a processed clear image, wherein the generative adversarial network model is trained using a preset training sample, the preset training sample includes a clear image sample and a blurred image sample corresponding to each other.

In some embodiments, the image processing apparatus further includes an image outputting module configured to output the processed clear image.

In some embodiments, the preset training sample includes a plurality of sets of images, and each set of images includes a clear image sample and a blurred image sample captured for a same object.

In some embodiments, the to-be-processed blurred image is obtained by a camera under a device screen taking an image of an object above the device screen, or the to-be-processed blurred image is captured during motion.

According to still another embodiment of the present disclosure, a storage medium with computer instructions stored thereon is provided. The computer instructions may be executed to perform steps of the image processing method.

According to yet another embodiment of the present disclosure, a terminal is provided. The terminal includes a processor and a memory with computer instructions stored thereon. When executed by the processor, the computer instructions may cause the processor to perform steps of the image processing method.

Compared with conventional technologies, embodiments of the present disclosure have following beneficial effects.

According to embodiments of the present disclosure, the trained generative adversarial network model can generate a corresponding clear image for the input blurred image.

Therefore, by inputting the to-be-processed blurred image to the trained generative adversarial network model, a processed clear image with higher definition can be obtained. Compared with existing image processing algorithms, embodiments of the present disclosure apply a deep learning model to process the to-be-processed blurred image, which does not require prior conditions, and can improve image quality under complex conditions.

In addition, images are processed after obtained by the under-screen camera according to embodiments of the present disclosure. In realizing improving the quality of the images, no additional hardware components are needed with respect to processing the images during capturing images by the under-screen camera, and a hole digging operation on the device screen can also be avoided and an equipment cost can be reduced.

DETAILED DESCRIPTION

As described in the background art, for a true full-screen device, since the camera is disposed below the screen, the under-screen camera needs to capture images through the screen, which may result in a poor image quality including ghosting, blurring, and other issues in the captured images.

According to embodiments of the present disclosure, the trained generative adversarial network model can generate a corresponding clear image for the input blurred image. Therefore, by inputting the to-be-processed blurred image obtained by the under-screen camera to the trained generative adversarial network model, a processed clear image with higher definition can be obtained. Compared with existing image processing algorithms, embodiments of the present disclosure apply a deep learning model to process the to-be-processed blurred image, which does not require prior conditions, and can improve image quality under complex conditions. In addition, images are processed after obtained by the under-screen camera according to embodiments of the present disclosure. In realizing improving the quality of the images, no additional hardware components are needed with respect to processing the images during capturing images by the under-screen camera, and a hole digging operation on the device screen can also be avoided and an equipment cost can be reduced.

In order to make above objectives, features and advantages of the present disclosure more obvious and understandable, specific embodiments of the present disclosure will be described in detail below with reference to the accompanying drawings.

Figure 1:
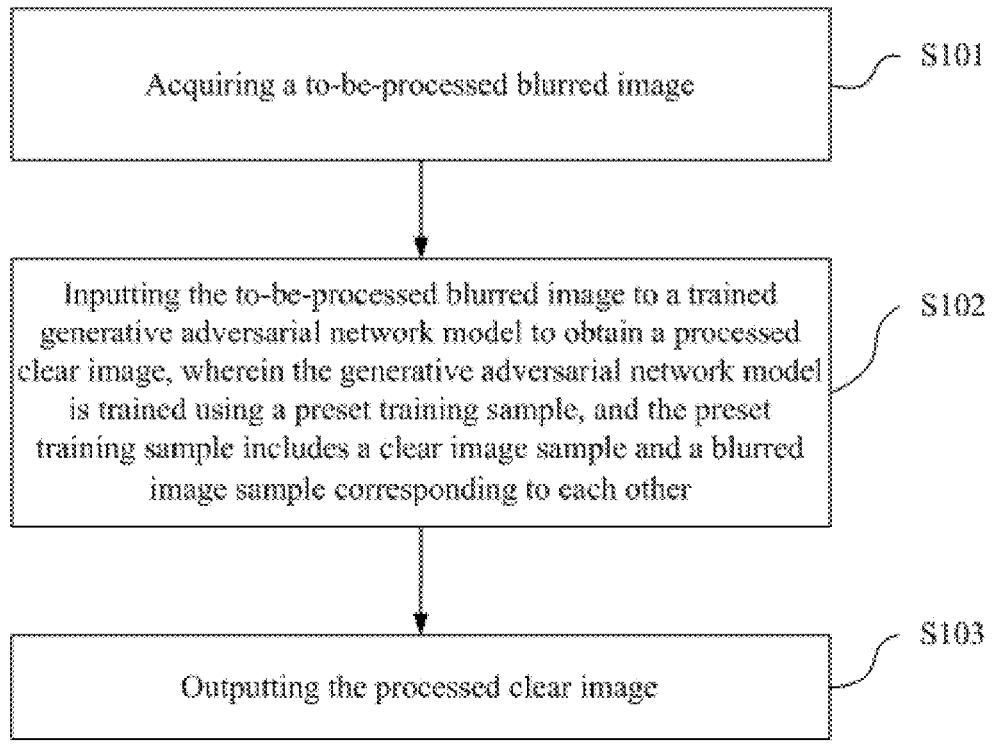
FIG. 1 schematically illustrates a flow chart of an image processing method according to an embodiment of the present disclosure.

FIG. 1 schematically illustrates a flow chart of an image processing method according to an embodiment of the present disclosure.

The image processing method can be applied on a terminal device with an under-screen camera, such as a mobile phone, a tablet computer, etc., that is, each step of the method shown in FIG. 1 can be executed by the terminal device.

The image processing method shown in FIG. 1 may include following S101, S102 and S103.

In S101, a to-be-processed blurred image is acquired.

In S102, the to-be-processed blurred image is input to a trained generative adversarial network model to obtain a processed clear image, wherein the generative adversarial network model is pre-trained using a preset training sample, the preset training sample includes a clear image sample and a blurred image sample corresponding to each other.

In S103, the processed clear image is output.

It should be noted that the sequence number of each step in some embodiments does not represent a limitation on the execution order of each step.

In a specific embodiment of S101, the to-be-processed blurred image is obtained by a camera under a device screen taking an image of an object above the device screen, or the to-be-processed blurred image is captured during motion. Specifically, the to-be-processed blurred image may be directly acquired from an under-screen camera; or, the to-be-processed blurred image may be acquired from a buffer stored with the image captured by the under-screen camera.

The under-screen camera in some embodiments refers to a camera that is disposed below a device screen. For example, a mobile phone screen is a full screen, and the under-screen camera is a front camera disposed below the full screen.

When the under-screen camera captures images, light needs to pass through the device screen to reach a camera sensor, and the device screen blocks and refracts the light reaching the camera sensor, reducing the amount of light incident or generating stray light, which causes poor image quality of the captured to-be-processed blurred image, such as ghosting and blurring.

In a specific implementation of S102, the generative adversarial network (GAN) model is trained using a preset training sample. The preset training sample includes a plurality of sets of images, and each set of images includes a clear image sample and a blurred image sample captured for a same object with a same background. Specifically, in the training process, the input of the generative adversarial network model is a blurred image sample and a clear image sample corresponding to each other, and a generator will generate a pseudo clear image after each iteration. When the training of the generative adversarial network model is completed, the to-be-processed blurred image can be input to the trained generative adversarial network model, and the generated clear image is output, that is, the pseudo clear image which is very similar to the real clear image.

It should be noted that the clear image sample may refer to an image with a resolution greater than a first preset threshold value, the blurred image sample may refer to an image with a resolution less than a second preset threshold value, and the first preset threshold value is greater than or equal to the second preset threshold value. Specific values of the first preset threshold value and the second preset threshold value can be set according to actual application environments, which is not limited in the embodiments of the present disclosure. In some embodiments, the resolution of the clear image sample and the blurred image sample may be 256*256 or more, the network will automatically zoom and crop the image, the cropping value can be adjusted, and the image size must not be lower than the cropping value set by the network, since the low cropping value will affect the generative adversarial network model effect.

Specifically, the generative adversarial network model may include a generator and a discriminator. When training the generative adversarial network model, the generator may generate a pseudo clear image from a blurred image sample, and the discriminator may determine whether the image generated by the generator is true or false. The purpose of the training is to improve the ability of the discriminator to determine that the clear image generated by the generator is pseudo, and to continuously improve the ability of the generator to pass through the judgement of the discriminator, and finally obtain a generator with high ability to restore clear image so as to be an image processing tool; when the training of the generative adversarial network model is completed, the generator is configured to generate the processed clear image based on the to-be-processed blurred image, and the processed clear image can be output by the generative adversarial network model. An optimization process of the generator is to increase the probability that the generated image is predicted to be true by the discriminator and make the generated image close to the clear image sample in each set of images. An optimization process of the discriminator is to maximize the probability that the image generated by the generator is determined to be false and the clear image sample in each set of images is determined to be true.

By inputting the to-be-processed blurred image into the generative adversarial network model, the processed clear image can be acquired. Compared with the to-be-processed blurred image, the processed clear image is an image with higher definition. Therefore, the image quality of the to-be-processed blurred image can be improved through above steps.

Furthermore, in a specific implementation of S103, the processed clear image may be output for subsequent processing procedures. For example, the processed clear image is shown to the user, or the processed clear image is used for identity verification.

According to embodiments of the present disclosure, the trained generative adversarial network model can generate a corresponding clear image for the input blurred image. Therefore, by inputting the to-be-processed blurred image obtained by the under-screen camera to the trained generative adversarial network model, a processed clear image with higher definition can be obtained. Compared with existing image processing algorithms, embodiments of the present disclosure apply a deep learning model to process the to-be-processed blurred image, which does not require prior conditions, and can improve image quality under complex conditions. In addition, images are processed after obtained by the under-screen camera according to embodiments of the present disclosure. In realizing improving the quality of the images, no additional hardware components are needed with respect to processing the images during capturing images by the under-screen camera, and a hole digging operation on the device screen can also be avoided and an equipment cost can be reduced.

In some embodiments of the present disclosure, the processed clear image includes a human face, and S103 shown in FIG. 1 may include: outputting the processed clear image for human face recognition.

In some embodiments, the to-be-processed blurred image may be a face image, that is, the to-be-processed blurred image is an image obtained by shooting a user's face by the under-screen camera. Both the to-be-processed blurred image and the processed clear image include human face.

Thus, after the processed clear image is obtained in S102, since the processed clear image is an image with higher definition, the human face in the processed clear image also has higher definition. In this case, the processed clear image can be used to perform human face recognition, thereby improving the success rate and accuracy of the human face recognition.

In a specific application scenario, the device needs to capture the user's face for identity verification in order to turn on the device, or unlock the device or unlock an application program. If the to-be-processed blurred image obtained by the under-screen camera is directly used, the identity verification will fail because the image quality of the to-be-processed blurred image is poor. Therefore, the human face recognition can be performed by the processed clear image obtained in S101 and S102, which can greatly improve the accuracy of human face recognition and improve user experience.

In some embodiments of the present disclosure, S103 shown in FIG. 1 may include: outputting the processed clear image to a display interface for display.

In some embodiments, after the processed clear image is obtained in S102, the processed clear image may be output to the display interface of the device, for example, the device screen, for displaying to the user. Compared with directly displaying the image obtained by the under-screen camera to the user, the embodiments of the present disclosure can display the processed clear image with higher definition to the user, which improves the user experience.

Figure 2:
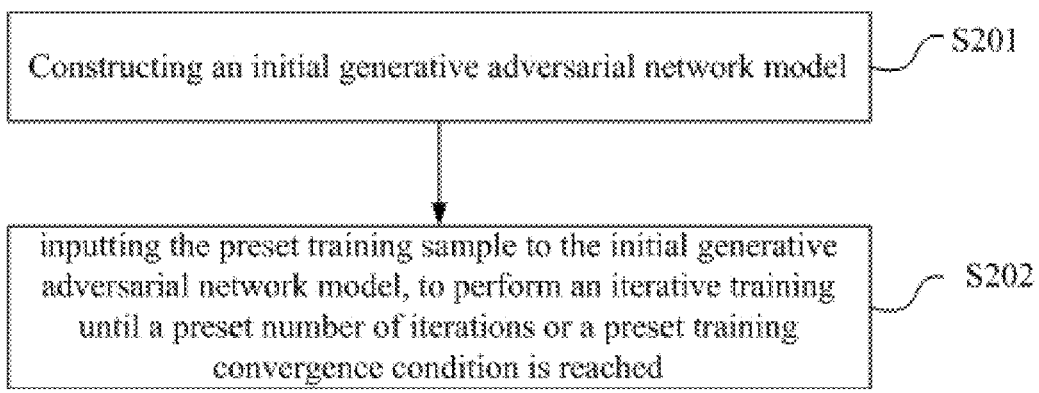
FIG. 2 schematically illustrates a flow chart of training a generative adversarial network model according to an embodiment of the present disclosure.

In some embodiments of the present disclosure, referring to FIG. 2, training the generative adversarial network model includes following S201 and S202.

In S201: an initial generative adversarial network model is constructed.

In S202: the preset training sample is input to the initial generative adversarial network model, and an iterative training is performed until a preset number of iterations or a preset training convergence condition is reached.

In some embodiments, when training the generative adversarial network model, the initial generative adversarial network model may be constructed firstly. Specifically, as mentioned above, the generative adversarial network model may include a generator and a discriminator. The generator may generate a pseudo clear image from a blurred image sample, and the discriminator may determine whether the image generated by the generator is true or false. An optimization process of the generator is to increase the probability that the generated image is predicted to be true by the discriminator and make the generated image close to the clear image sample in each set of images. An optimization process of the discriminator is to maximize the probability that the image generated by the generator is determined to be false and the clear image sample in each set of images is determined to be true.

In some embodiments, the generator uses a deep residual network, the discriminator uses a customizable multilayer convolutional neural network, and the loss function of the generative adversarial network may use least squares generative adversarial network (LSGAN) loss, including discriminator loss and generator loss, which are shown as follows:

The discriminator loss is:

$$\min_{D} loss_D = \frac{1}{2}\mathbb{E}_{x \sim P_{data}(x)}[(D(x)-b)^2] + \frac{1}{2}\mathbb{E}_{z \sim P_G(z)}[(D(G(z))-a)^2]$$

The generator loss is:

$$\min_{G} loss_G = \frac{1}{2} \mathbb{E}_{z \sim P_G(z)}[(D(G(z)) - c)^2]$$

In the above two equations, G represents the generator, D represents the discriminator, Pdata is the real data distribution, $P_G$ is the generated data distribution of the generator, x is the real image sample that is the clear image sample, and z is the generated image sample that is the pseudo clear image, a and b are the coding parameters of the generated image sample and the real image sample of the discriminator respectively, and c is the coding parameter of the generated image sample of the generator, which is a value determined by the generator in order for the discriminator to judge that the image generated by the generator is real clear image. Generally, a=−1, b=1, c=0 or a=1, b=c=1, E represents the expected value. The discriminator loss represented by the first formula includes the part that judging the real clear image and the part that judging the pseudo clear image, and its purpose is to distinguish and accurately judge the real clear image as true and the pseudo clear image as false. The generator loss represented by the second formula includes the part of generating the pseudo clear image, and its purpose is to make the discriminator believe that the image generated by the generator is a real clear image.

Further, the preset training sample may be input to the initial generative adversarial network model, and a iteration training is performed, and parameters of the model are updated, until the preset number of iteration training or training convergence conditions are reached. Specifically, the training convergence condition may be that a loss degree calculated according to the loss function (generator loss and discriminator loss) reaches a preset value or falls within a preset range.

It should be understood that the preset value or the preset range may be an empirical value set according to an actual application scenario.

In a specific application scenario, after completing the training of the generative adversarial network model, trained model parameters can be obtained, and the trained generative adversarial network model and model parameters are embedded into devices, such as mobile phones, tablets, etc. By running the generative adversarial network model in the device, the steps of above-mentioned image processing method may be performed, and the image captured by the under-screen camera of the device may be processed, thus the processed clear image with higher definition may be obtained.

In some embodiments of the present disclosure, a loss function of the generative adversarial network model in the embodiments of the present disclosure may be a least squares generative adversarial network (LSGAN) loss. By using LSGAN to perform the above image processing process, a better image processing effect and faster speed can be obtained.

It should be noted that, according to actual application scenarios and different training data, different generative adversarial network models can be adaptively selected, their main difference is the loss function. For example, a traditional generative adversarial network model and a Wasserstein generative adversarial network with gradient penalty (WGAN-GP) model, etc.

In some embodiments of the present disclosure, the clear image sample is obtained by a camera taking images of the object without being blocked by anything disposed between the camera and the object, and the blurred image sample is obtained by the device camera under a test screen taking images of the object disposed above the test screen. The test screen and the device screen have a same optical parameter. The device camera may be a separate camera or integrated into a phone.

In some embodiments, for each set of images used for training the generative adversarial network model, the clear image sample and the blurred image sample are captured for a same object with a same background. In addition, the clear image sample is obtained by a camera taking images of the object without being blocked by anything disposed between the camera and the object, the blurred image sample is obtained by the device camera under a test screen taking images of the object disposed above the test screen. Since the test screen itself has optical parameters, such as refractive index, light transmittance, etc., when the camera passes through the test screen, the test screen will interfere with the imaging of the camera. Therefore, the clear image sample has higher definition than the blurred image sample.

Further, in order to simulate the influence of the device screen on the imaging of the under-screen camera, the test screen and the device screen have the same optical parameter. For example, the test screen and the device screen have the same refractive index, light transmittance, etc.

In some embodiments of the present disclosure, in order to obtain a better model training effect, the clear image sample and the blurred image sample corresponding to each other may have the same resolution.

That is to say, the clear image sample and the blurred image sample in each set of images used for training the generative adversarial network model have the same resolution, that is, the clear image sample and the blurred image sample have the same size. Moreover, there is no zooming relationship or magnification relationship between the clear image sample and the blurred image sample.

In some embodiments, the resolution of the clear image sample and the blurred image sample may be 256*256 or more, the network will automatically zoom and crop the image, the cropping value can be adjusted, and the image size must not be lower than the cropping value set by the network, since the low cropping value will affect the generative adversarial network model effect.

The image processing method of the embodiment of the present invention is suitable for processing various types of noisy images, such as blurred images captured by an under-screen camera or motion blurred images.

Figure 3:
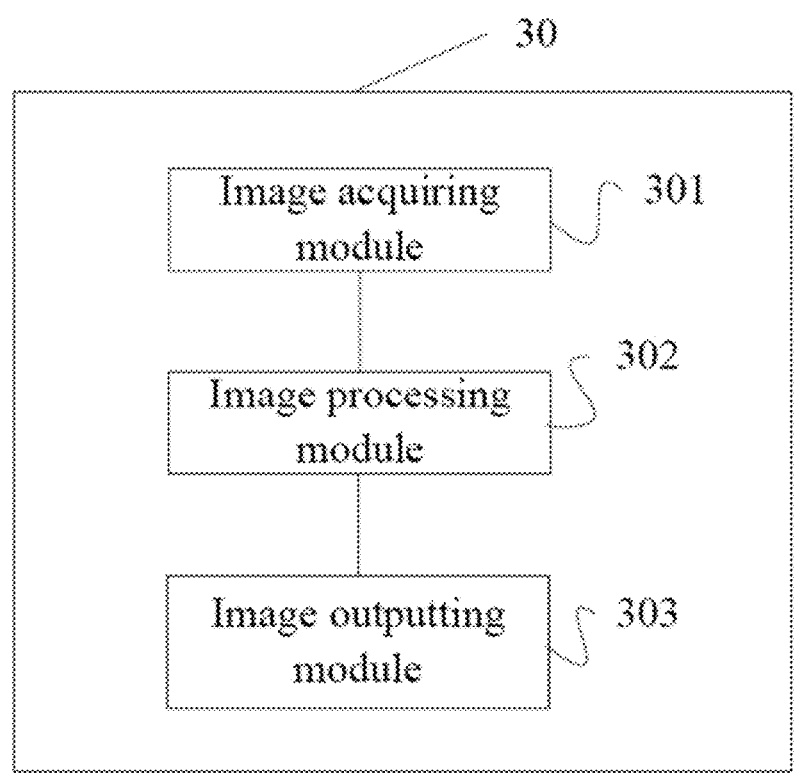
FIG. 3 illustrates a schematic structural view of an image processing apparatus according to an embodiment of the present disclosure.

Another embodiment of the present disclosure also discloses an image processing device 30. Referring to FIG. 3, the image processing device 30 may include an image acquiring module 301, an image processing module 302, and an image outputting module 303.

The image acquiring module 301 is configured to acquire a to-be-processed blurred image, wherein the to-be-processed blurred image is obtained by an under-screen camera through a device screen.

The image processing module 302 is configured to input the to-be-processed blurred image to a trained generative adversarial network model to obtain a processed clear image, wherein the generative adversarial network model is trained using a preset training sample, the preset training sample includes a plurality of sets of images, and each set of images includes a clear image sample and a blurred image sample corresponding to each other.

The image outputting module 303 is configured to output the processed clear image.

According to embodiments of the present disclosure, the trained generative adversarial network model can generate a corresponding clear image for the input blurred image. Therefore, by inputting the to-be-processed blurred image obtained by the under-screen camera to the trained generative adversarial network model, a processed clear image with higher definition can be obtained. Compared with existing image processing algorithms, embodiments of the present disclosure apply a deep learning model to process the to-be-processed blurred image, which does not require prior conditions, and can improve image quality under complex conditions. In addition, images are processed after obtained by the under-screen camera according to embodiments of the present disclosure. In realizing improving the quality of the images, no additional hardware components are needed with respect to processing the images during capturing images by the under-screen camera, and a hole digging operation on the device screen can also be avoided and an equipment cost can be reduced.

In some embodiments of the present disclosure, the processed clear image includes a human face, and the image outputting module 303 may output the processed clear image for human face recognition.

In some embodiments of the present disclosure, the image outputting module 303 may output the processed clear image to a display interface for display.

In some embodiments of the present disclosure, the generative adversarial network model may be trained by following modules: a constructing module (not shown in the figure) configured to construct the initial generative adversarial network model, and a training module (not shown in the figure) configured to input the preset training sample into the initial generative adversarial network model, and an iterative training is performed until a preset number of iterations or a preset training convergence condition is reached.

In some embodiments of the present disclosure, the clear image sample is obtained by a camera taking images of the object without being blocked by anything disposed between the camera and the object, and the blurred image sample is obtained by the device camera under a test screen taking images of the object disposed above the test screen. The test screen and the device screen have the same optical parameter.

Further, the clear image sample and the blurred image sample have the same resolution.

For more details on the working principle and working mode of the image processing device 30, reference may be made to related descriptions with reference to FIGS. 1 to 2, which will not be repeated herein.

Another embodiment of the present disclosure also discloses a storage medium. The storage medium may be a computer-readable storage medium, and includes computer instructions stored thereon. The computer instructions are executed to perform steps shown in FIG. 1 or FIG. 2. The storage medium may include ROM, RAM, magnetic disk or optical disk, etc. The storage medium may also include non-volatile memory (non-volatile) or non-transitory memory, etc.

Another embodiment of the present disclosure also discloses a terminal. The terminal may include a memory and a processor, and the memory includes computer instructions stored thereon which can be executed by the processor. When executed by the processor, the computer instructions may cause the processor to perform steps shown in FIG. 1 or FIG. 2. The terminal includes, but is not limited to, terminal devices such as mobile phones, computers, and tablet computers.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

The invention claimed is:

1. An image processing method, comprising:
   acquiring a to-be-processed blurred image; and
   inputting the to-be-processed blurred image to a trained generative adversarial network model to obtain a processed clear image, wherein the generative adversarial network model is trained using a preset training sample, and the preset training sample comprises a clear image sample and a blurred image sample corresponding to each other;
   wherein training the generative network model comprises:
   constructing an initial generative adversarial network model; and
   inputting the preset training sample to the initial generative adversarial network model, to perform an iterative training until a preset number of iterations or a preset training convergence condition is reached.

2. The image processing method according to claim 1, wherein the preset training sample comprises a plurality of sets of images, and each set of images comprises a clear image sample and a blurred image sample captured for a same object.

3. The image processing method according to claim 2, wherein the to-be-processed blurred image is obtained by a camera under a device screen taking an image of an object above the device screen, or the to-be-processed blurred image is captured during motion.

4. The image processing method according to claim 1, wherein the processed clear image comprises a human face, and the image processing method further comprises:
   outputting the processed clear image for human face recognition.

5. The image processing method according to claim 1, further comprising:
   outputting the processed clear image to a display interface for display.

6. The image processing method according to claim 1, wherein a loss function of the generative adversarial network model is least squares generative adversarial network loss.

7. The image processing method according to claim 3, wherein the clear image sample is obtained by the camera taking images of the object without being blocked by anything disposed between the camera and the object, and the blurred image sample is obtained by the camera under a test screen taking images of the object disposed above the test screen, where the test screen and the device screen have a same optical parameter.

8. The image processing method according to claim 1, wherein the clear image sample and the blurred image sample have a same resolution.

9. The image processing method according to claim 1, wherein the generative adversarial network model comprises a generator and a discriminator, when training the generative adversarial network model, the generator is configured to generate a pseudo clear image from the blurred image sample, and the discriminator is configured to determine the pseudo clear image generated by the generator being true or false; when the training of the generating adversarial network model is completed, the generator is configured to generate the processed clear image based on the to-be-processed blurred image.

10. An image processing apparatus, comprising:
an image acquiring module configured to acquire a to-be-processed blurred image; and
an image processing module configured to input the to-be-processed blurred image to a trained generative adversarial network model to obtain a processed clear image, wherein the generative adversarial network model is trained using a preset training sample, the preset training sample comprises a clear image sample and a blurred image sample corresponding to each other;
wherein training the generative adversarial network model comprises:
constructing an initial generative adversarial network model; and
inputting the preset training sample to the initial generative adversarial network model, to perform an iterative training until a preset number of iterations or a preset training convergence condition is reached.

11. The image processing apparatus according to claim 10, further comprising an image outputting module configured to output the processed clear image.

12. The image processing apparatus according to claim 10, wherein the preset training sample comprises a plurality of sets of images, and each set of images comprises a clear image sample and a blurred image sample captured for a same object.

13. The image processing apparatus according to claim 12, wherein the to-be-processed blurred image is obtained by a camera under a device screen taking an image of an object above the device screen, or the to-be-processed blurred image is captured during motion.

14. A storage medium with computer instructions stored thereon, wherein the computer instructions are executed to perform steps of the image processing method according to claim 1.

15. A terminal, comprising a processor and a memory with computer instructions stored thereon, wherein the computer instructions, when executed by the processor, cause the processor to perform steps of the image processing method according to claim 1.

* * * * *